United States Patent
Wang et al.

(10) Patent No.: US 11,159,936 B2
(45) Date of Patent: Oct. 26, 2021

(54) METHOD AND APPARATUS FOR HANDLING USER SERVICE PROFILE INFORMATION IN A COMMUNICATIONS NETWORK IMPLEMENTING MOBILE EDGE COMPUTING (MEC)

(71) Applicant: Nokia Solutions and Networks Oy, Espoo (FI)

(72) Inventors: Laurence Wang, Qingdao (CN); Yigang Cai, Naperville, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/963,627

(22) PCT Filed: Jan. 25, 2018

(86) PCT No.: PCT/EP2018/051885
§ 371 (c)(1),
(2) Date: Jul. 21, 2020

(87) PCT Pub. No.: WO2019/145039
PCT Pub. Date: Aug. 1, 2019

(65) Prior Publication Data
US 2020/0351637 A1    Nov. 5, 2020

(51) Int. Cl.
*H04L 29/08* (2006.01)
*H04W 8/20* (2009.01)
*H04W 4/029* (2018.01)

(52) U.S. Cl.
CPC ............ *H04W 8/20* (2013.01); *H04L 67/306* (2013.01); *H04W 4/029* (2018.02)

(58) Field of Classification Search
CPC ........ H04W 8/20; H04W 4/029; H04L 67/306
See application file for complete search history.

(56) References Cited

U.S. PATENT DOCUMENTS

2018/0316564 A1* 11/2018 Senarath ............. H04L 41/5006
2018/0343694 A1* 11/2018 Tomishige ............ H04W 76/15

FOREIGN PATENT DOCUMENTS

| GB | 2543825 A | 5/2017 |
| WO | WO-2017012674 A1 | 1/2017 |
| WO | WO-2017220158 A1 | 12/2017 |

OTHER PUBLICATIONS

"Mobile Edge Computing (MEC); Framework and Reference Architecture", ETSI Draft Specification; MEC 003, European Telecommunications Standards Institute (ETSI), 650, Route Des Lucioles ; F-06921 Sophia-Antipolis ; France, vol. ISG MEC Multi-access Edge Computing, No. V1 .2.0 Dec. 1, 2017 (Dec. 1, 2017), pp. 1-18, XP014303917, Retrieved from the Internet: <URL:docbox.etsi.org/ISG/MEC/70>Draft/003/ MEC-003v211Archv120DRAFT gs_MEC003v211_ 120_clean.docx [retrieved on Dec. 1, 2017].

(Continued)

*Primary Examiner* — Ted M Wang
(74) *Attorney, Agent, or Firm* — Harness, Dickey & Pierce, P.L.C.

(57) ABSTRACT

A method of handling user service profile information in a communications network, the communications network including a core network (CN) and a radio access network (RAN), includes receiving, at a first network element located in the CN, a first application status change message from a first mobile edge computing (MEC) server located in the RAN, the first application status change message indicating one or more applications currently running on the first MEC server; detecting a location update message received at the CN from a UE attached to the RAN; and in response to detecting the location update message, obtaining service profile data of the UE for at least one service corresponding to at least one of the one or more applications, and providing the obtained service profile data to the first MEC server.

20 Claims, 4 Drawing Sheets

(56) References Cited

OTHER PUBLICATIONS

International Search Report PCT/ISA/210 and Written Opinion of the International Searching Authority PCT/ISA/237 for International Application No. PCT/EP2018/051885 dated Sep. 6, 2018.

* cited by examiner

METHOD AND APPARATUS FOR HANDLING USER SERVICE PROFILE INFORMATION IN A COMMUNICATIONS NETWORK IMPLEMENTING MOBILE EDGE COMPUTING (MEC)

CROSS-REFERENCE TO RELATED APPLICATIONS

This application is a national phase under 35 U.S.C. § 371 of PCT International Application No. PCT/EP2018/051885 which has an International filing date of Jan. 25, 2018, the entire contents of each of which are hereby incorporated by reference.

BACKGROUND

1. Field

Example embodiments relate generally mobile edge computing (MEC) systems, and particularly to handling user service profile information in a communications network that implements MEC.

2. Related Art

Mobile Edge Computing (MEC) is an emerging technology in THE 5G era which enables the provision of the cloud and IT services within the proximity of mobile subscribers. MEC allows the availability of the cloud servers inside or adjacent to the base station. The end-to-end latency perceived by the mobile user may therefore be reduced with the MEC platform.

The European Telecommunications Standards Institute (ETSI) is currently working on the development of an MEC standard under an Industry Specification Group (ISG), with a goal of allowing efficient and seamless integration of applications from different equipment vendors, telecom service providers, over-the-top (OTT) service providers and third parties.

SUMMARY

According to at least some example embodiments, a method of handling user service profile information in a communications network, the communications network including a core network (CN) and a radio access network (RAN), includes receiving, at a first network element located in the CN, a first application status change message from a first mobile edge computing (MEC) server located in the RAN, the first application status change message indicating one or more applications currently running on the first MEC server; detecting a location update message received at the CN from a UE attached to the RAN; and in response to detecting the location update message, obtaining service profile data of the UE for at least one service corresponding to at least one of the one or more applications, and providing the obtained service profile data to the first MEC server.

The location update message may be a message indicating the UE attached to the RAN.

The location update message may be a message indicating the UE switched to being attached to a first base station (BS) included in the RAN from being attached to a second BS included in the RAN, the first BS being associated with the first MEC server, the second BS being associated with an MEC server other than the first MEC server.

The obtaining may include identifying, by the first network element, one or more first services by querying a subscriber database located in the CN, the one or more first services being one or more services to which the UE subscribes; determining, by the first network element, one or more second services, the one or more second services being one or more services associated with the one or more applications currently running on the first MEC server; determining, by the first network element, one or more third services such that each of the one or more third services is a service included in both the one or more first services and the one or more second services; and obtaining, from the subscriber database, service profile data of the UE for the one or more third services.

The subscriber database may be a home subscriber server (HSS).

The subscriber database may be a unified data management (UDM) platform.

The providing may include generating an MEC service policy; creating an entry in the MEC service policy; including the obtained service profile data in the entry; and providing the MEC service policy, including the entry, to the first MEC server.

The providing may further include including a priority parameter in the entry, the priority parameter being an indication, to the first MEC server, of a manner in which the first MEC server is to prioritize to provision of service to the UE relative to other UEs attached to the RAN.

The providing may further include including an MEC service trigger parameter in the entry, the MEC service trigger parameter being an indication, to the first MEC server, of a scenario within which the first MEC server is to serve the UE in accordance with the obtained service profile data.

The method may further include receiving a second application status change message indicating one or more applications currently running on the first MEC server; and in response to receiving the second application status change message, generating an updated MEC service policy by updating the entry; and providing the updated MEC service policy, including the updated entry, to the first MEC server.

The generating of the MEC service policy may include generating the MEC service policy at a policy charging and rules function (PCRF) node or a policy control function (PCF) node located in the CN.

According to at least some example embodiments, a communications system includes a first network element included in a core network (CN), the first network element including memory storing computer-executable instructions, and one or more processors configured to execute the computer executable instructions such that the one or more processors are configured to receive a first application status change message from a first mobile edge computing (MEC) server located in radio access network (RAN), the first application status change message indicating one or more applications currently running on the first MEC server, detect a location update message received at the CN from a UE attached to the RAN, and in response to detecting the location update message, obtain service profile data of the UE for at least one service corresponding to at least one of the one or more applications, and provide the obtained service profile data to the first MEC server.

The communications system may further include a subscriber database included in the CN.

The one or more processors may be further configured to execute the computer-executable code such that the one or more processors are configured to identify one or more first services by querying a subscriber database included in the CN, the one or more first services being one or more services to which the UE subscribes, determine one or more second services, the one or more second services being one or more services associated with the one or more applications currently running on the first MEC server, determine one or more third services such that each of the one or more third services is a service included in both the one or more first services and the one or more second services, and obtain, from the subscriber database, service profile data of the UE for the one or more third services.

The subscriber database may be a home subscriber server (HSS).

The subscriber database may be a unified data management (UDM) platform.

The communications system may further include the CN, wherein the first element includes at least one of a policy charging and rules function (PCRF) node of the CN or a policy control function (PCF) node of the CN.

The communications system may further include the CN and the RAN.

The one or more processors may be further configured to execute the computer-executable code such that the providing of the obtained service profile data to the first MEC server includes generating an MEC service policy, creating an entry in the MEC service policy, including the obtained service profile data in the entry, and providing the MEC service policy, including the entry, to the first MEC server.

The one or more processors may be further configured to execute the computer-executable code such that one or more processors are further configured to receive a second application status change message indicating one or more applications currently running on the first MEC server, and in response to receiving the second application status change message, generate an updated MEC service policy by updating the entry, and provide the updated MEC service policy, including the updated entry, to the first MEC server.

BRIEF DESCRIPTION OF THE DRAWINGS

At least some example embodiments will become more fully understood from the detailed description provided below and the accompanying drawings, wherein like elements are represented by like reference numerals, which are given by way of illustration only and thus are not limiting of example embodiments and wherein.

DETAILED DESCRIPTION OF EXAMPLE EMBODIMENTS

Figure 1A:
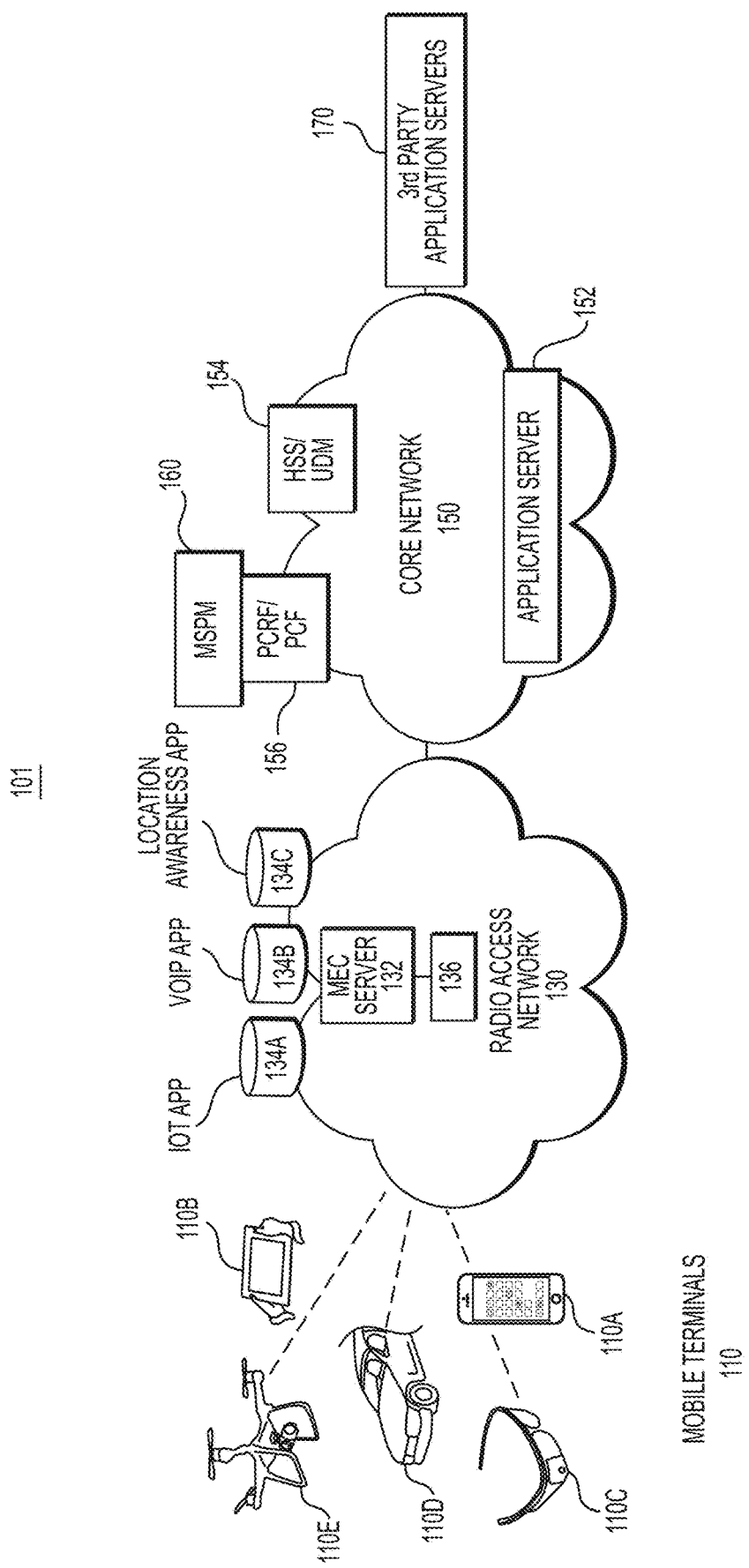
FIG. 1A is a diagram illustrating a portion of a communications network according to one or more example embodiments.

Various example embodiments will now be described more fully with reference to the accompanying drawings in which some example embodiments are shown.

Detailed illustrative embodiments are disclosed herein. However, specific structural and functional details disclosed herein are merely representative for purposes of describing at least some example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term mobile terminal may be considered synonymous to, and may hereafter be occasionally referred to, as a user equipment (UE), terminal, mobile terminal, mobile unit, mobile device, mobile station, mobile user, access terminal (AT), subscriber, user, remote station, access terminal, receiver, etc., and may describe a remote user of wireless resources in a wireless communication network. The term base station (BS) may be considered synonymous to and/or referred to as a Node B, evolved Node B (eNB), base transceiver station (BTS), Home eNB (HeNB), access point (AP), etc. and may describe equipment that provides the radio baseband functions for data and/or voice connectivity between a network and one or more users.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

The program modules and functional processes discussed herein may be implemented using existing hardware in existing communication networks. For example, program modules and functional processes discussed herein may be implemented using existing hardware at existing network elements or control nodes (e.g., an e node B (enB) or a radio network controller (RNC) included in the radio access network (RAN) illustrated in FIG. 1A, and/or a server implementing a policy charging and rules function (PCRF), or policy control function (PCF), included in the core network (CN) illustrated in FIG. 1A). Such existing hardware may include one or more digital signal processors (DSPs), application-specific-integrated-circuits (ASICs), field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

Overview of Mobile Edge Computing

Cloud computing is transforming internet content storage, access and caching. Many emerging applications (such as the Internet of Things (i.e. IoT), smart cities, healthcare and driverless vehicles) may be very latency sensitive and, thus, may benefit from local computing storage capacity. As a proactive content caching approach at the edge to distribute content, mobile edge computing (MEC) processes applications closer to the users. With a goal of reducing network congestion, MEC may play a pivotal role in the 5G network as an edge computing platform. Other names for MEC include, for example, Mini Cloud, Cloudlet, Mobile Edge Cloud, Multi-access Edge Computing or Fog Computing.

Mobile Edge Computing (MEC) is an emerging technology in 5G era which enables the provision of the cloud and IT services within the proximity of mobile subscribers. It allows the availability of the cloud servers inside or adjacent to the base station. The end-to-end latency perceived by the mobile user may therefore be reduced with the MEC platform. Further, context-aware services are able to be served by the application developers by leveraging the real-time RAN information from MEC. The MEC additionally enables the execution of computationally intensive applications in resource-constrained devices with collaborative computing involving the cloud servers.

The European Telecommunications Standards Institute (ETSI) is currently working on the development of an MEC standard under an Industry Specification Group (ISG), with a goal of allowing efficient and seamless integration of applications from different equipment vendors, telecom service providers, over-the-top (OTT) service providers and third parties. For example, ETSI has produced ETSI Group Specification MEC 003 v1.1.1 (ETSI GS 003 v1.1.1 (2016-03)), which includes examples of a framework and reference architecture for MEC.

MEC provides a new ecosystem and value chain and the opportunity for all players within MEC to collaborate and develop new business models they can each benefit from. The next generation of mobile applications is already poised to change the way end users interact with the world around them. In order to achieve the aforementioned goals, processes occurring at the edge of the network should be considered.

An example architecture of a communications network that employs MEC will be discussed in greater detail, below, with reference to FIG. 1A. According to at least some example embodiments, the architecture illustrated in FIG. 1A provides a high performance and telecom-grade cloud platform in the RAN thus allowing the computation to happen at the network edge. Benefits of MEC are applicable to both the downstream data from the core network (CN) and the upstream data from the mobile terminals. An MEC server can be deployed inside or outside of a RAN server (e.g., a base station, WiFi hotspot server, radio network controller (RNC), etc.). Applications can be dynamically deployed and executed on the MEC server based on business needs to serve mobile terminals as the applications did when executed on the CN.

Examples of MEC use cases include, but are not limited to, IoT, smart city, video analysis, enterprise/campus/transport management, traffic offload, service delivery acceleration, etc. For example, an augmented reality (AR) application on a smart-phone or tablet overlays augmented reality content onto objects viewed on the device camera. Applications on the MEC server can provide, for example, local object tracking and local AR content caching. Such a solution may reduce or, alternatively, minimize round trip time and increase or, alternatively, maximize throughput for increased or, alternatively, optimum user quality of experience. Applications on the MEC server can also be used, for example, to offer consumer or enterprise propositions, such as tourist information, sporting event information, advertisements etc.

Many applications that will run on the MEC server will need to access user service profiles for mobile terminals that interact with the applications. The process of handling the user service profiles needed by the MEC to run these applications may have a number of issues.

For example, the service profiles are often stored in subscriber databases which are located away from the MEC server, for example, on the CN. One solution would be to transfer all the service profiles for certain mobile terminals from the subscriber databases on the CN to the MEC server. However, because it may be difficult to predict which mobile terminal will be served by one or multiple MEC servers, it may be impractical to move the service profile data for mobile terminals from the CN to the MEC servers. If an MEC server needs to retrieve service profile data (e.g., user policy and subscription data) from the CN for each mobile terminal that interacts with an application running on the MEC server, substantial latency may result. This latency may not acceptable in some latency sensitive applications like vehicle collision avoidance system, etc. Further, such latency may be incompatible with certain 5G requirements including, for example, latency requirements associated with Ultra-Reliability Low Latency Communications (URLLC).

In order to avoid the drawbacks associated with the latency discussed above, another possible solution would include storing all user service profile data on the MEC server instead of the CN. However, the process of storing all user service profile data on each MEC server may require significant storage resources at each MEC server and may also require significant communications resources associated with transferring large amounts of user service profile data from the CN to each MEC server. Thus, the option of transferring all user service profile data to each MEC server may be inefficient. Further, as a number of mobile terminals and/or applications associated with an MEC server increases, the degree of inefficiency of the option of transferring all user service profile data to each MEC grows further.

Example methods and apparatuses for handling the above-referenced service profile data in a manner that may avoid or, alternatively, reduce the severity of the latency and inefficiency issues discussed above will now be discussed below with reference to FIGS. 1-4.

Example Network Architecture

FIG. 1A is a diagram illustrating a portion of a communications network 101 according to one or more example embodiments. Communications network 101 implements MEC. For example, according to at least some example embodiments, communications network 101 implements MEC in accordance with group specification ETSI GS 003 v1.1.1 (2016-03) the contents of which are incorporated, herein, by reference.

Communications network 101 includes mobile terminals 110, a RAN 130 and a CN 150. According to at least some example embodiments, communications network 101 may also include $3^{rd}$ party application servers 170.

Mobile terminals 110 are devices that are capable of communicating wirelessly with the RAN 130. Mobile terminals 110 may also be referred to, in the present disclosure, as UEs 110. One or more of mobile terminals 110 may be internet of things (IoT) devices. In the example illustrated in FIG. 1A, mobile terminals 110 include a smart phone 110A, a tablet 110B, a wearable 110C, a vehicle integrated device 110D, and a remote control vehicle 110E. In the example illustrated in FIG. 1A, the wearable 110C is a head-mounted display (e.g., an augmented reality (AR) headset). Other examples of wearables include smart watches, smart pendants, smart jewelry, etc. The vehicle integrated device 110D may be, for example, any device that is integrated in a vehicle and is capable of communicating with the internet. For example, the vehicle integrated device 110D could include one, or a combination of, a multimedia system, a navigation system, and an auto-driving or self-driving system. In the example illustrated in FIG. 1A, the remote control vehicle 110E is a drone or quadcopter. Mobile terminals 110A-110E are provided as examples. The mobile terminals 110 included in communications network 101 are not limited to the number or type of mobile terminals illustrated in FIG. 1A. An example structure of the mobile terminals 110 is discussed in greater detail below with reference to FIG. 1B. The RAN 130 will now be discussed in greater detail below.

The RAN 130 facilitates wireless communication between the mobile terminals 110 and the CN 150 in accordance with one or more radio access technologies (RATs). Examples of the types of RATs the RAN 130 may implement include, but are not limited to, RATs associated with the Long-Term Evolution (LTE), CDMA2000, and/or Global System for Mobile Communications (GSM) standards. For example, according to at least some example embodiments, the RAN 130 may include components of an Evolved Universal Mobile Telecommunications System (UMTS) Terrestrial Radio Access Network (E-UTRAN) including, for example, one or more evolved Node Bs (eNBs). As another example, according to at least some example embodiments, the RAN 130 may include components of a CDMA2000 RAN including, for example, one or more base transceiver stations (BTSs) and one or more radio network controllers (RNCs). As another example, according to at least some example embodiments, the RAN 130 may include components of the UMTS Terrestrial Radio Access Network (UTRAN) including, for example, one or more Node Bs and one or more RNCs. For ease of description, BTSs, Node Bs and eNBs are, on occasion, collectively referred to as base stations (BSs). Consequently, descriptions of a BS in the present disclosure may apply to any or all of a BTS, Node B and eNB depending on which RATs the RAN 130 implements.

The RAN 130 also includes a MEC server 132. According to at least some example embodiments, the RAN 130 includes one or more MEC servers 132 and the one or more MEC servers 132 are stand-alone network elements (i.e., separate from other network elements included in the RAN 130). In addition to, or as an alternative to, the RAN 130 including one or more stand-alone MEC servers 132, according to at least some example embodiments, one or more MEC servers 132 may be integrated into one or more of the network elements included in the RAN 130 such that the one or more RAN 130 network elements perform the operations of an MEC server 132. Examples of network elements in the RAN 130 that an MEC server 132 can be separate from or, alternatively, integrated into include, for example, the one or more BTSs, Node Bs, eNBs and/or RNCs included in the RAN 130.

Though, as is discussed above, the RAN 130 may include multiple MEC servers 132, for the purpose of clarity, FIG. 1A will be explained with respect, primarily, to an example in which the RAN 130 includes one MEC server 132.

The MEC server 132 may facilitate the execution of one or more network applications instantiated on the MEC server 132. Because the MEC server 132 is closer to the mobile terminals 110 than the CN 150 is within the network topology of the communications network 101, a latency users of the mobile terminals 110 experience may be reduced when the mobile terminals 110 interact with a network application being executed on the MEC server 132 in comparison with a scenario in which the same network application is executed, instead, on the CN 150. In the example illustrated in FIG. 1A, an IoT application 134A (e.g., a smart home appliance control/monitoring application), a voice-over-IP (VoIP) application 134B (e.g., a video chatting application) and a location awareness application 134C (e.g., a friend location tracking application) are instantiated on the MEC server 132.

As will be discussed in greater detail below, the MEC server 132 may receive and store data associated with one or more of the instantiated applications 134A-134C. According to at least some example embodiments, the MEC server 132 may store the received data in internal storage included in the MEC server 132. According to at least some example embodiments, in addition to, or as an alternative to, storing the received data in internal storage, the MEC server 132 may store the received data in a local database 136, which may also be included in the RAN 130.

An example structure of the network elements included in the RAN 130 (e.g., the MEC server 132, local database 136, and the one or more BSs and/or RNCs that may be included in the RAN 130) is discussed in greater detail below with reference to FIG. 1C. The CN 150 will now be discussed in greater detail below.

The CN 150 may include one or more application servers 152 and one or more $3^{rd}$ party application servers 170. The one or more application servers 152 and the one or more $3^{rd}$ party application servers 170 may facilitate the execution of network applications at the CN 150. The network applications facilitated by the one or more application servers 152 may be, for example, network applications of a network operator of the communications network 101 (e.g., network applications associated with, or managed by, the network operator of the communications network 101). The network applications facilitated by the one or more $3^{rd}$ party application servers 170 may be, for example, network applications of a $3^{rd}$ party entity (e.g., network applications associated with, or managed by, an entity other than the network operator of the communications network 101).

The CN 150 may include a subscriber database 154 and a policy function 156 and.

The subscriber database 154 may store subscriber information for each of a plurality of users who subscribe to one or more services offered by a network operator of the communications network 101. The subscriber information stored at the subscriber database 154 for a user may include many different types of information, examples of which include, but are not limited to, subscriber type or class information of the user, priority or quality of service (QoS) class information of the user, and/or permissions information indicating privileges, limits and/or prohibitions of the user with respect to various network activities. The subscriber information stored at the subscriber database 154 may also include application-specific information corresponding to each of a plurality of applications with which a user is associated.

According to at least some example embodiments, the subscriber database 154 may be a home subscriber server (HSS) or a unified data management (UDM) platform. According to at least some example embodiments, the subscriber database 154 may include or, alternatively, be implemented by a home subscriber server (HSS) and/or a unified data management (UDM) platform.

The policy function 156 may perform the functions of, for example, the known policy and charging rules function (PCRF) and/or policy control function (PCF) including, for example, accessing information and functions used by an operator of the wireless communications network 100 to manage and/or monitor network usage including, for example, subscriber databases (e.g., the subscriber database 154), charging functions, and network policy information. According to at least some example embodiments of the inventive concepts, the policy function 156 may be implemented by a server included in the CN 150.

The CN 150 also includes a MEC service profile manager (MSPM) 160. The MSPM 160 may also be referred to in the present disclosure as the MEC service profile management logic 160 and/or the MSPM logic 160. According to at least some example embodiments, the MSPM 160 is included in the policy function 156, and functions of both the MSPM 160 and policy function 156 may be performed by the same server included in the CN 150. According to at least some example embodiments, the MSPM 160 and policy function 156 may be implemented, respectively, by separate servers included in the CN 150.

Example functions of the MSPM 160 and MEC server 132 will be discussed in greater detail, below, with reference to FIGS. 2-4. An example structure of the mobile terminals 110, according to at least some example embodiments, will now be discussed below with reference to FIG. 1B. Further, an example structure of network elements included in the RAN 130 and the CN 150 will now be discussed below with reference to FIG. 1C.

Example Network Element and Mobile Terminal Structures

Figure 1C:
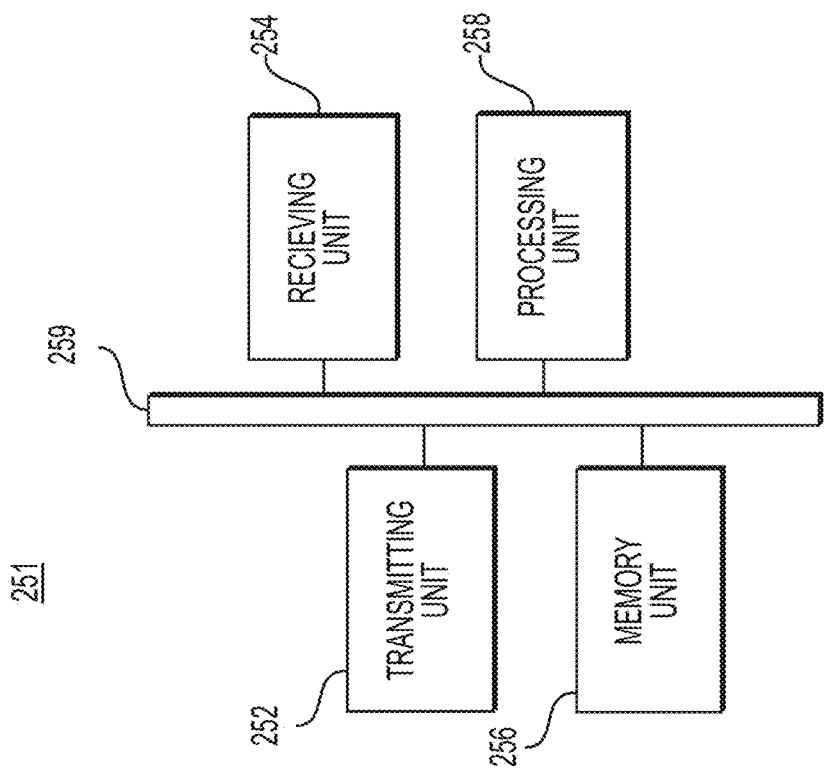
FIG. 1C is a diagram illustrating an example structure of a network element according to at least one example embodiment.
Figure 1B:
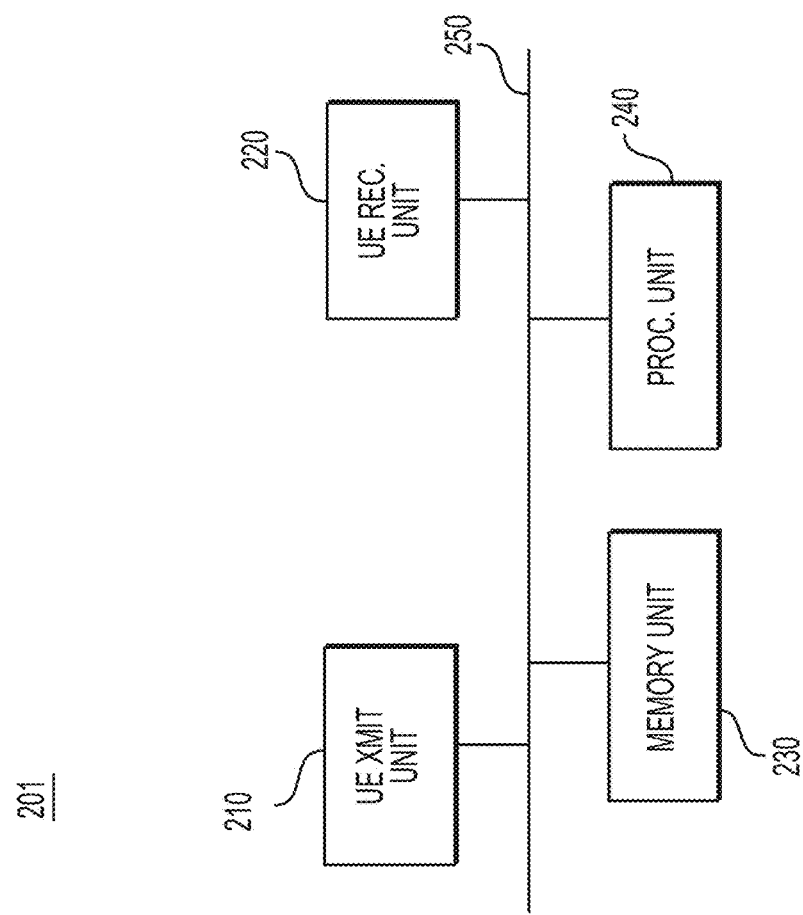
FIG. 1B is a diagram illustrating an example structure of a mobile terminal according to at least one example embodiment.

FIG. 1B is a diagram illustrating an example structure of a UE 201. According to example embodiments, any or all mobile terminals in the communications network 101 (e.g., any or all of the mobile terminals 110) may have the same structure and operation as UE 201 described below.

The UE 201 may include, for example, a UE transmitting unit 210, a UE receiving unit 220, a memory unit 230, a processing unit 240, and a data bus 250.

The UE transmitting unit 210, UE receiving unit 220, memory unit 230, and processing unit 240 may send data to and/or receive data from one another using the data bus 250. The UE transmitting unit 210 is a device that includes hardware and any necessary software for transmitting wireless signals on an uplink (reverse link) channel including, for example, data signals or control signals, via one or more wireless connections to other wireless devices and/or network elements (e.g., eNBs, BSs, NodeBs, other UEs, etc.).

The UE receiving unit 220 is a device that includes hardware and any necessary software for receiving wireless signals on a downlink (forward link) channel including, for example, data signals or control signals, via one or more wireless connections to other wireless devices and/or network elements (e.g., eNBs, BSs, NodeBs, other UEs, etc.).

The memory unit 230 may be any storage medium capable of storing data including magnetic storage, flash storage, random access memory (RAM), etc.

The processing unit 240 may be any device capable of processing data including, for example, a processor. The term 'processor', as used herein, refers to, for example, a hardware-implemented data processing device having circuitry that is physically structured to execute desired operations including, for example, operations represented as computer-executable code and/or instructions included in a program. Examples of the above-referenced hardware-implemented data processing device include, but are not limited to, a microprocessor, a central processing unit (CPU), a multicore processor, a processor core, a multiprocessor, an application-specific integrated circuit (ASIC), and a field programmable gate array (FPGA).

According to at least one example embodiment, any operations described in the present disclosure, for example with reference to any of FIGS. 1-4, as being performed by a UE or a mobile terminal may be performed by an electronic device having the structure of the UE 201 illustrated in FIG. 1B. For example, according to at least one example embodiment, the UE 201 may be programmed, in terms of software and/or hardware, to perform any or all of the functions described in the present disclosure as being performed by a UE or mobile terminal.

Consequently, each of the UEs and mobile terminals described in the present disclosure may be embodied as a special purpose computer through software and/or hardware programming.

Examples of the UE 201 being programmed, in terms of software, to perform any or all of the functions described herein as being performed by any of the UEs or mobile terminals described herein will now be discussed below. For example, the memory unit 230 may store a program including executable instructions corresponding to any or all of the operations described herein with reference to FIGS. 1-4 as being performed by a UE or mobile terminal. According to at least one example embodiment, in addition, or as an alternative, to being stored in the memory unit 230, the executable instructions may be stored in a computer-readable medium including, for example, an optical disc, flash drive, SD card, etc., and the UE 201 may include hardware for reading data stored on the computer readable-medium. Further, the processing unit 240 may be a processor configured to perform any or all of the operations described herein with reference to FIGS. 1-4 as being performed by a UE or mobile terminal, for example, by reading and executing the executable instructions stored in at least one of the memory unit 230 and a computer readable storage medium loaded into hardware included in the UE 201 for reading computer-readable mediums.

Examples of the UE 201 being programmed, in terms of hardware, to perform any or all of the functions described herein as being performed by a UE or mobile terminal will now be discussed below. Additionally or alternatively to executable instructions corresponding to the functions described with reference to FIGS. 1-4 as being performed by a network element being stored in a memory unit or a computer-readable medium as is discussed above, the processing unit 240 may include a circuit (e.g., an integrated circuit) that has a structural design dedicated to performing any or all of the operations described herein with reference to FIGS. 1-4 as being performed by a UE or mobile terminal. For example, the above-referenced circuit included in the processing unit 240 may be a FPGA or ASIC physically programmed, through specific circuit design, to perform any or all of the operations described with reference to FIGS. 1-4 as being performed by a UE or mobile terminal.

FIG. 1C is a diagram illustrating an example structure of a network element 251. According to example embodiments, any or all network elements in the communications network 101, including for example the MSPM 160, the MEC Server 132, the PCRF/PCF 156, the HSS/UDM 154, the application server 152, the $3^{rd}$ party application servers 170, and BSs, Node Bs, eNBs and/or RNCs included in the RAN 130 may have the structure and operation described below with respect to network element 251.

Referring to FIG. 1C, the network element 251 may include, for example, a data bus 259, a transmitting unit 252, a receiving unit 254, a memory unit 256, and a processing unit 258.

The transmitting unit 252, receiving unit 254, memory unit 256, and processing unit 258 may send data to and/or receive data from one another using the data bus 259.

The transmitting unit 252 is a device that includes hardware and any necessary software for transmitting signals including, for example, control signals or data signals via one or more wired and/or wireless connections to one or more other network elements in communications network 101. The transmitting unit may also transmit signals to UEs.

The receiving unit 254 is a device that includes hardware and any necessary software for receiving wireless signals including, for example, control signals or data signals via one or more wired and/or wireless connections to one or more other network elements in the communications network 101. The receiving unit may also receive signals from UEs.

The memory unit 256 may be any device capable of storing data including magnetic storage, flash storage, etc.

The processing unit 258 may be any device capable of processing data including, for example, a processor.

According to at least one example embodiment, any operations described herein, for example with reference to any of FIGS. 1-4, as being performed by a network element may be performed by an electronic device having the structure of the network element 251 illustrated in FIG. 1C. Examples of network elements include the MEC server 132, the MSPM 160, the policy function 156, the subscriber database 154, the application server 152, the 3rd party application servers 170, and the one or more BSs, Node Bs, eNBs and/or RNCs included in the RAN 130. For example, according to at least one example embodiment, the network element 251 may be programmed, in terms of software and/or hardware, to perform any or all of the functions described herein as being performed by a network element (or an element of a network element including, for example, any or all of the MEC service policy unit 262, the MEC application management unit 264, the UE service profile management unit 334, the MEC service policy execution unit 336, and/or the application status unit 338, each of which will be described in greater detail below with reference to FIGS. 2-4). Consequently, each of the network elements described herein may be embodied as a special purpose computer through software and/or hardware programming.

Examples of the network element 251 being programmed, in terms of software, to perform any or all of the functions described herein as being performed by any of the network elements described herein will now be discussed below. For example, the memory unit 256 may store a program including executable instructions corresponding to any or all of the operations described herein with reference to FIGS. 1-4 as being performed by a network element. According to at least one example embodiment, additionally or alternatively to being stored in the memory unit 256, the executable instructions may be stored in a computer-readable medium including, for example, an optical disc, flash drive, SD card, etc., and the network element 251 may include hardware for reading data stored on the computer readable-medium. Further, the processing unit 258 may be a processor configured to perform any or all of the operations described herein with reference to FIGS. 1-4 as being performed by a network element, for example, by reading and executing the executable instructions stored in at least one of the memory unit 256 and a computer readable storage medium loaded into hardware included in the network element 251 for reading computer-readable mediums.

Examples of the network element 251 being programmed, in terms of hardware, to perform any or all of the functions described herein as being performed by a network element will now be discussed below. Additionally or alternatively to executable instructions corresponding to the functions described with reference to FIGS. 1-4 as being performed by a network element being stored in a memory unit or a computer-readable medium as is discussed above, the processing unit 258 may include a circuit (e.g., an integrated circuit) that has a structural design dedicated to performing any or all of the operations described herein with reference to FIGS. 1-4 as being performed by a network element. For example, the above-referenced circuit included in the processing unit 258 may be a FPGA or ASIC physically programmed, through specific circuit design, to perform any or all of the operations described with reference to FIGS. 1-4 as being performed by a network element.

Example functions of the MSPM 160 and the MEC server 132 will now be discussed in greater detail, below, with reference to FIGS. 2-4.

Overview of MSPM and MEC Server Functions

Figure 2:
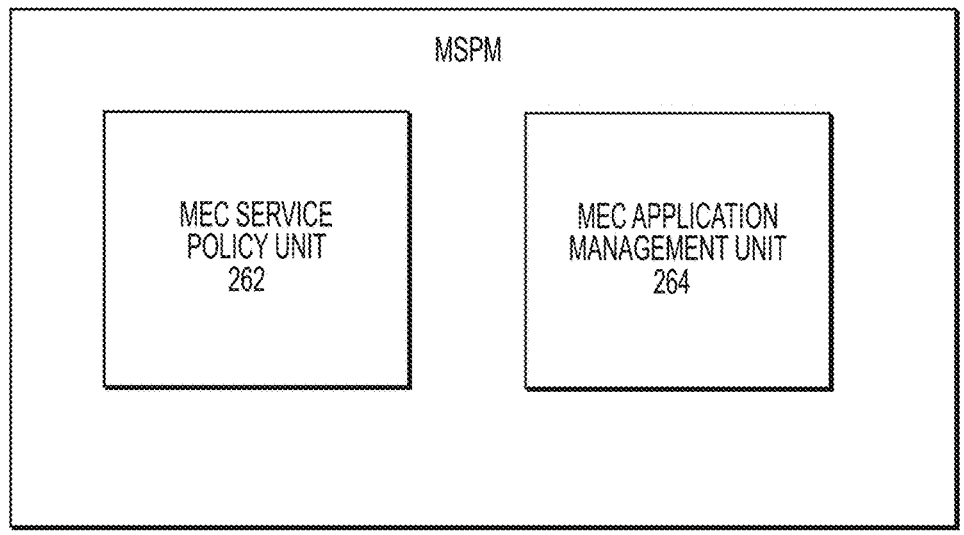
FIG. 2 is a diagram illustrating an example of a mobile edge computing (MEC) service profile manager according to at least some example embodiments.
Figure 3:
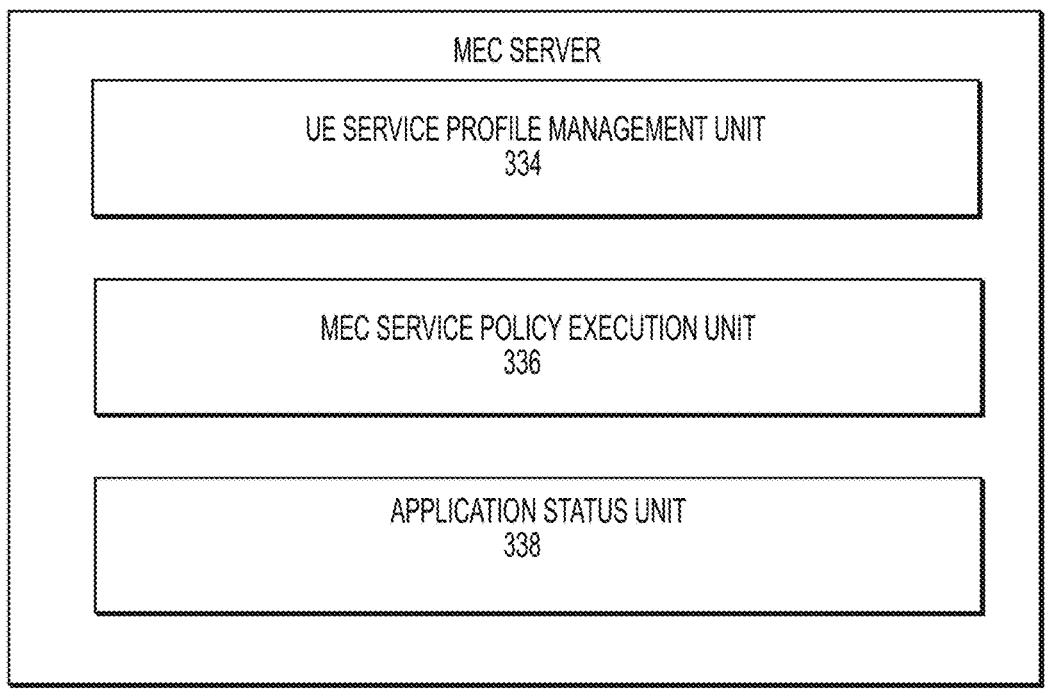
FIG. 3 is a diagram illustrating an example of an MEC server according to at least some example embodiments.

FIG. 2 is a diagram illustrating an example of the MSPM 160 according to at least some example embodiments, and FIG. 3 is a diagram illustrating an example of the MEC server 132 according to at least some example embodiments.

Referring to FIG. 2, the MSPM 160 may include an MEC service policy unit 262 and an MEC application management unit 264. According to at least some example embodiments, the MEC service policy unit 262 is responsible for retrieving service profile data of UEs, and providing the service profile data to the MEC server 132, as will be discussed in greater detail below with reference to FIG. 4. According to at least some example embodiments, the MEC application management unit 264 is responsible for maintaining the list of applications that are running on one or more MEC server. For example, as will be discussed in greater detail, below, with reference to FIG. 4, the MEC application management unit 264 may subscribe to application status change messages output by one or more MEC servers, and may update, for each MEC server, the list of applications currently running on the MEC server based on information, included in the application status messages, indicating the instantiation and/or termination of one or more applications on the MEC servers that sent the application status messages.

The term "service profile data" or "user service profile data" refers to information included in, or retrieved from, one or more service profiles. The term "service profile data" or "user service profile data" may also be referred to, in the present disclosure, as "service profile information" or "user service profile information." One example of such a service profile is an internet protocol (IP) multimedia subsystem (IMS) application service profile. Examples of service profile information that may be included in an IMS application service profile for a UE will now be discussed below.

For example, as is known, in general, an IMS service profile for a UE may indicate what services that the UE has (e.g., the IMS services the UE is subscribed to or has access to). For example, the IMS application service profile may indicate one or more service types. Examples of service types that may be indicated by the IMS application service profile of the UE include, but are not limited to, enriched messaging, video call, conference call, and web communication (e.g., WebRTC). The IMS application service profile for the UE can further include information indicating which communication diversion (CDIV) services are enabled for the UE. As is known, communication forwarding unconditional (CFU), communication forwarding busy (CFB), and communication barring (CB) are some examples CDIV services which may be enabled for a UE and indicated in the IMS application service profile of the UE. The IMS service profile of the UE may also include one or more lawful interception indicators indicating the types of lawful interception of IMS communications that are enabled for the UE.

The service profile information of an IMS service profile discussed above is provided as an example. The service profile information that may be included in an IMS application service profile of a UE is not limited to the examples discussed above. Further, as is known, service profiles exist for applications and/or services other than IMS applications/services.

An example of the MEC server 132 will now be discussed, below, with reference to FIG. 3.

As is illustrated in FIG. 3, the MEC server 132 may include a UE service profile management unit 334, an MEC service policy execution unit 336, and an application status unit 338. According to at least some example embodiments, UE service profile management unit 334 may store the service profile data received at the MEC server 132 from the MSPM 160 (e.g., the MEC service policy unit 262) in a local database (e.g., the local database 136).

Further, the MEC service policy execution unit 336 may serve a UE by providing the UE with one or more services associated with one or more applications running on the MEC server 132 in accordance with service profile data (e.g., service profile data received from the MSPM 160 and stored in the local database 136) associated with UE and at least one of the one or more applications running on the MEC server 132.

According to at least some example embodiments, the application status unit 338 may keep track of which applications are running on the MEC server 132, and generate an application status change report in response to determining that the running status of an application associated with the MEC server 132 has changed (e.g., from running to not running, or from not running to running).

Example methods of operation the MEC server 132 and the MSPM 160 will now be discussed below with reference to FIG. 4.

Figure 4:
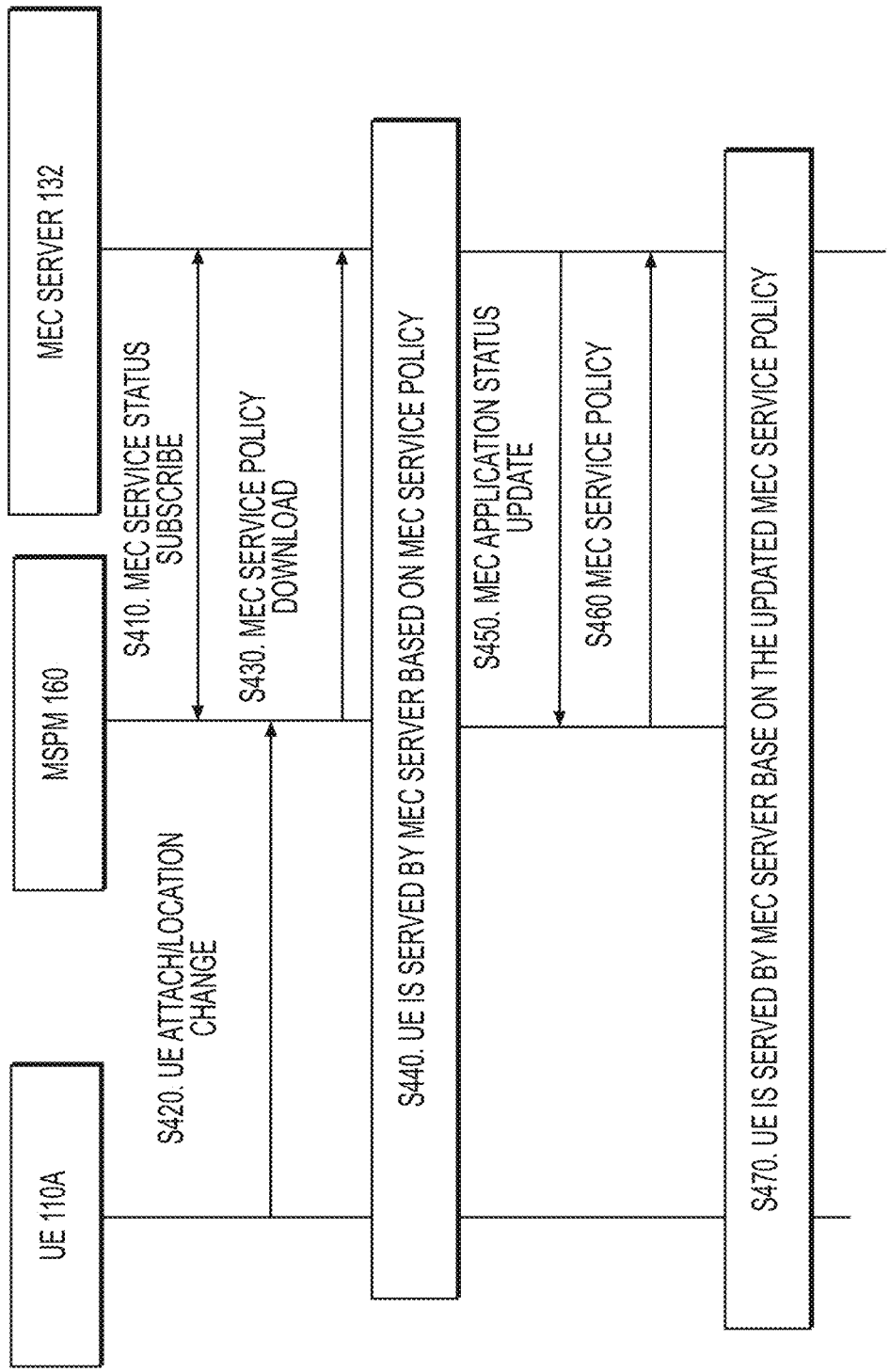
FIG. 4 is a communication flow diagram illustrating a method of handling user service profile information in a communications network implementing MEC.

FIG. 4 is a communication flow diagram illustrating a method of handling user service profile information in a communications network implementing MEC. For ease of description, FIG. 4 will be discussed with respect, primarily, to a scenario in which the UE 110A attaches to the RAN 130, which includes a single MEC server, MEC server 132. However, the descriptions of the operations of the UE 110A provided below with reference to FIG. 4 may apply to any UE included in the communications network 101, including any or all of UEs 110.

Referring to FIG. 4, in operation S410, the MSPM 160 may subscribe to service status information generated by the MEC server 132. For example, in operation S410, the MEC application management unit 264 of the MSPM 160 may subscribe to the application status change report generated by the application status unit 338 of the MEC server 132. For example, the MEC application management unit 264 may send a subscription request message to the MEC server 132, and the application status unit 338 may respond to the subscription request message by providing any application status change reports generated subsequently by the application status unit 338 to the MSPM 160.

In operation S420, the UE 110A may send a location update message to the CN 150 (e.g., via the RAN 130) indicating that the UE 110A has attached to the RAN 130 (e.g., by attaching to a BS included in the RAN 130) or changed location within an area corresponding to the RAN 130. The MSPM 160, which is included in the CN 150, may detect the location update message and respond to the location update message by retrieving service profile information of the UE 110A and using the retrieved profile information to generate an MEC service policy for the UE 110A.

For example, according to at least some example embodiments, for each UE from among the UEs 110 that attaches to the RAN 130, the MSPM 160 (e.g., the MEC service policy unit 262) generates an MEC service policy. For example, the MSPM 160 may generate an MEC service policy for the UE 110A when the UE 110A first attaches to the RAN 130. As another example, the MSPM 160 may generate MEC service policies for UEs that perform an MEC swap. An MEC swap is defined as a UE changing location within an area associated with an RAN such that an MEC server associated with the UE changes as a result of the move. For example, the following is an example of a location change that constitutes an MEC swap: the UE 110A moves such that the UE 110A changes from being attached to a first network element (e.g., BS or RNC) of the RAN 130 to being attached to a second network element (e.g., BS or RNC) of the RAN 130 (e.g., via a handover operation according to known methods), and the first and second network elements are associated with different MEC servers (e.g., the second network element is associated with the MEC server 132, and the first network element is associated with an MEC server other than the MEC server 132).

According to at least some example embodiments, when a UE attaches to the RAN 103 or performs an MEC swap, the MSPM 160 (e.g., the MEC service policy unit 262) generates a MEC service policy for the UE based on the applications that are running on the MEC server 132 and the services that UE has (e.g., the services a user of the UE has subscribed to). MEC service policies will now be discussed in greater detail below.

The MEC service policy for generated by the MSPM 160 for each UE that attaches to the RAN 130 or performs an MEC swap includes a set of entries. Each entry carries the UE's service profile for one or multiple applications that are running on the MEC server 132. For example, when generating the MEC service policy of the UE 110A, the MSPM 160 (e.g., the MEC service policy unit 262) determines whether the UE 110A has (e.g., is subscribed to) the services provided by each application that is running on the MEC server 132. For each application running on the MEC server 132, the UE 110A may or may not be subscribed to a service associated with the application. Thus, the generated MEC service policy may or may or may not include an entry corresponding to each application running on the MEC server 132. When at least one application running on the MEC server 132 corresponds to a service to which the UE 110A is subscribed, the MSPM 160 creates a new entry in the MEC service policy of the UE 110A to carry a service profile and MEC related controlling parameters.

According to at least some example embodiments, an entry in an MEC service policy generated by the MSPM 160 for the UE 110A may include the following items:

The UE 110A's service profile for one or multiple applications running on the MEC server 132; and MEC-related control parameters.

The service profile and MEC-related control parameters will now be discussed in greater detail, below.

With respect to the service profile included in the entry for the MEC service policy, the included service profile may be the UE 110A's service profile for one or multiple applications that are currently running on the MEC server and correspond to a service to which the UE110A is subscribed. The MSPM 160 may retrieve the service profile for the UE 110A from, for example, a database or databases associated with the one or multiple applications. For example, if the UE 110A is subscribed to an internet protocol (IP) multimedia subsystem (IMS) service and a corresponding IMS application is running on the MEC server 132, the MSPM 160 may retrieve the UE 110As IMS service profile from the subscriber database 154 and add the retrieved IMS service profile to the entry in the MEC service policy generated by the MSPM 160 for the UE 110A.

With respect to the MEC controlling parameters included in the entry for the MEC service policy, examples of the MEC controlling parameters include, but are not limited to:

Priority; and

MEC service trigger criteria.

The Priority and MEC service trigger criteria MEC controlling parameters will now be discussed in greater detail below.

The priority MEC controlling parameter indicates the service priority of the UE 110A. For example, in a scenario where a service throttle caused by a resource shortage at the MEC server 132 occurs, the MEC server 132 (e.g., the MEC service policy execution unit 336) will prioritize UEs with high priority parameters over UEs with lower priority parameters when determining the UEs for which service is provided presently and determining the UEs for which service is postponed.

The MEC service trigger criteria specify the scenarios in which that the UE 110A should be served by the application(s) running on MEC server 132 (and/or scenarios in which service should be discontinued for the UE 110A). Once the specified criteria are met, the MEC server 132 (e.g., the MEC service policy execution unit 336) begins (or ends) the services associated with the MEC service policy entry.

According to at least some example embodiments, the MEC service trigger criteria included in an MEC service policy entry applies to every service associated with that MEC service policy entry. For example, the MEC server 132 may begin (and/or discontinue) every service associated with the entry in the MEC service policy based on the MEC service trigger criteria included in the entry.

According to at least some example embodiments, the service profile included in the aforementioned entry in the MEC service policy generated for the UE 110A by the MSPM 160 is a temporary user profile. For example, the MSPM 160 (e.g., the MEC service policy unit 262) may generate a time window for the service profile. Further, according to at least some example embodiments, when the time window expires, the MSPM 160 generates a new temporary profile for downloading and/or the MEC server 132 may request a new profile from MSPM 160.

Returning to FIG. 4, after operation S420, the MSPM 160 provides the MEC service policy generated in operation S420 to the MEC server 132.

For example, according to at least some example embodiments, once the MSPM 160 generates the MEC service policy, the MSPM 160 (e.g., the MEC service policy unit 262) transmits the MEC service policy to MEC server 132 in operation S430.

In operation S440, the MEC server 132 serves the UE 110A in accordance with the service profile information included in the MEC service policy sent from the MSPM 160 to the MEC server 132 in operation S430. For example, the MEC server 132 (e.g., the MEC service policy execution unit 336) may refer to the service profile information included in an entry of the UE 110As MEC service policy, retrieve user policy and/or subscription data associated with one or more applications being run on the MEC server 132 from the service profile information, and provide the UE 110A with one or more services corresponding to the one or more applications based on the retrieved user policy and/or subscription data.

In operation S450, the MEC server 132 generates an application status change message and transmits the application status change message to the MSPM 160.

For example, according to at least some example embodiments, when the MEC server 132 (e.g., the application status unit 338) detects a network change (e.g., a change in which applications are currently instantiated on the MEC server 132), the MEC server 132 notifies the MSPM 160 (e.g., the MEC application management unit 264) by sending the MSPM 160 an application status change message, and the MSPM 160 (e.g., the MEC service policy unit 262) responds to the notification by updating the MEC service policies of any or all affected UEs. For example, when the network change detected by the MEC server 132 is the instantiation of one or more new applications on the MEC server 132, the application status change message sent from the MEC server 132 to the MSPM 160 indicates the one or more new application currently running on the MEC server 132. In response to receiving the application status change message, the MSPM 160 (e.g., the MEC service policy unit 262) checks all the UEs served by the MEC server 132 to identify each of the served UEs that is subscribed to a service associated with at least one of the one or more new applications, and updates the MEC service policies of each identified UE by adding, to the MEC service policies of each identified UE, one or more entries corresponding to one or more services associated with the one or more new applications.

According to at least some example embodiments, the instantiation and/or termination of MEC applications on the MEC server 132 is controlled, for example, by a mobile edge orchestrator (not illustrated). The mobile edge orchestrator is and MEC system-level element described, for example, in ETSI group specification ETSI GS 003 v1.1.1 (2016-03). According to at least some example embodiments, the application status unit 338 may receive an indication from the mobile edge orchestrator when an application is instantiated on the MEC server 132 or terminated on the MEC server 132. Thus, according to at least some example embodiments, the MEC server 132 sends the MEC application status update in operation S450 in response to receiving an indication from the mobile edge orchestrator that one or more applications have been instantiated and/or terminated on the MEC server 132.

According to at least some example embodiments, the mobile edge orchestrator may be an element of the CN 150 that is separate from the MSPM 160. According to at least some other example embodiments, functions of the MSPM 160 and the mobile edge orchestrator may be performed by the same physical node (e.g., server) at the CN 150.

According to at least some example embodiments, instead of the MEC server 132 transmitting the application status update to the MSPM 160 in operation S450, operation S450 may include the mobile edge orchestrator notifying the MSPM 160 when an application is to be instantiated or terminated on the MEC server 132, and the MSPM 160 (e.g., the MEC service policy unit 262) may respond to the notification by updating the MEC service policies of any or all affected UEs.

In operation S460, the MSPM 160 (e.g., the MEC service policy unit 262) transmits the updated MEC service policies generated in operation S450 to MEC server 132.

In operation S470, the MEC server 132 serves the UE 110A in accordance with the service profile information included in the updated MEC service policy sent from the MSPM 160 to the MEC server 132 in operation S460. For example, the MEC server 132 (e.g., the MEC service policy execution unit 336) may refer to the service profile information included in an entry of the UE 110A's updated MEC service policy, retrieve user policy and/or subscription data associated with one or more applications being run on the MEC server 132 from the service profile information, and provide the UE 110A with one or more services corresponding to the one or more applications based on the retrieved user policy and/or subscription data.

According to at least some example embodiments, the MEC server 132 may improve the efficiency of the aforementioned MEC service policy entry creation and updating processes discussed above with reference to operations S420 and S450 by employing service profile sharing. For example, when one or more UEs are determined to have service profile information corresponding to one or more applications running on the MEC server 132 that is the same as non-expired service profile information included in a previously received MEC service policy of another UE, corresponding entries in the later-received MEC service policies may include a reference number or a pointer that refers to the service profile included in the previously received MEC service policy. The reference number or pointer may be used in place of an entire service profile, thus reducing an amount of space required by the MEC server 132 and/or local database 136 to store the later-received MEC service policies. According to at least some example embodiments, the MEC server 132 detects redundant service profiles in MEC service policies received from the MSPM 160, and replaces the detected redundant service policies with the aforementioned reference numbers or pointers.

Thus, according to at least some example embodiments, a process of providing service profile data from a CN to an MEC server of a RAN may be facilitated by using the MSPM 160 and MEC server 132. For example, as is discussed above with reference to FIG. 4, according to at least some example embodiments, the MSPM 160 of CN 150 receives a first application status change message from the MEC server 132 located in RAN 130. The first application status change message may indicate one or more applications currently running on the MEC server 132. The MSPM 160 may detect a location update message received at the CN from the UE 110A attached to the RAN, and in response to detecting the location update message, obtain service profile data of the UE for at least one service corresponding to at least one of the one or more applications. Further, the MSPM 160 may provide the obtained service profile data to the MEC server 132.

Further, according to at least some example embodiments, the MSPM 160 may provide the obtained service profile data to the MEC server 132 by generating an MEC service policy, creating an entry in the MEC service policy, including the obtained service profile data in the entry, and providing the MEC service policy, including the entry, to the MEC server 132. Additionally, the MEC server 132 may receive a second application status change message indicating one or more applications currently running on the MEC server 132, and, in response to receiving the second application status change message, generate an updated MEC service policy by updating the entry, and provide the updated MEC service policy, including the updated entry, to the MEC server 132.

Additionally, according to at least some example embodiments, the MSPM 160 identifies one or more services to which the UE 110A subscribes by querying a subscriber database 154 located in the CN 120. Further, the MSPM 160 may determine one or more services associated with the one or more applications currently running on the MEC server 132, and determine which services, among the one or more services to which the UE 110A subscribes, are included in the one or more services associated with the one or more applications currently running on the MEC server 132. Further, the MSPM 160 may obtain, from the subscriber database 154, service profile data of the UE for the one or more services to which the UE 110A subscribes that are also included in the one or more services associated with the one or more applications currently running on the MEC server 132.

Example embodiments being thus described, it will be obvious that embodiments may be varied in many ways. Such variations are not to be regarded as a departure from example embodiments, and all such modifications are intended to be included within the scope of example embodiments.

What is claimed:

1. A method of handling user service profile information in a communications network, the communications network including a core network (CN) and a radio access network (RAN), the method comprising:
receiving, at a first network element located in the CN, a first application status change message from a first mobile edge computing (MEC) server located in the RAN,
the first application status change message indicating one or more applications currently running on the first MEC server;
detecting a location update message received at the CN from a UE attached to the RAN; and
in response to detecting the location update message,
obtaining service profile data of the UE for at least one service corresponding to at least one of the one or more applications, and
providing the obtained service profile data to the first MEC server.

2. The method of claim 1, wherein the location update message is a message indicating the UE attached to the RAN.

3. The method of claim 1, wherein the location update message is a message indicating the UE switched to being attached to a first base station (BS) included in the RAN from being attached to a second BS included in the RAN,
the first BS being associated with the first MEC server,
the second BS being associated with an MEC server other than the first MEC server.

4. The method of claim 1, wherein the obtaining comprises:
identifying, by the first network element, one or more first services by querying a subscriber database located in the CN,
the one or more first services being one or more services to which the UE subscribes;
determining, by the first network element, one or more second services,
the one or more second services being one or more services associated with the one or more applications currently running on the first MEC server;
determining, by the first network element, one or more third services such that each of the one or more third services is a service included in both the one or more first services and the one or more second services; and
obtaining, from the subscriber database, service profile data of the UE for the one or more third services.

5. The method of claim 4, wherein the subscriber database is a home subscriber server (HSS).

6. The method of claim 4, wherein the subscriber database is a unified data management (UDM) platform.

7. The method of claim 1, wherein the providing comprises:
generating an MEC service policy;
creating an entry in the MEC service policy;
including the obtained service profile data in the entry; and
providing the MEC service policy, including the entry, to the first MEC server.

8. The method of claim 7, wherein the providing further comprises:
including a priority parameter in the entry,
the priority parameter being an indication, to the first MEC server, of a manner in which the first MEC server is to prioritize to provision of service to the UE relative to other UEs attached to the RAN.

9. The method of claim 7, wherein the providing further comprises:
including an MEC service trigger parameter in the entry,
the MEC service trigger parameter being an indication, to the first MEC server, of a scenario within which the first MEC server is to serve the UE in accordance with the obtained service profile data.

10. The method of claim 7, further comprising:
receiving a second application status change message indicating one or more applications currently running on the first MEC server; and
in response to receiving the second application status change message,
generating an updated MEC service policy by updating the entry; and
providing the updated MEC service policy, including the updated entry, to the first MEC server.

11. The method of claim 7, wherein the generating of the MEC service policy includes generating the MEC service policy at a policy charging and rules function (PCRF) node or a policy control function (PCF) node located in the CN.

12. A communications system comprising:
a first network element included in a core network (CN),
the first network element including,
memory storing computer-executable instructions, and
one or more processors configured to execute the computer executable instructions such that the one or more processors are configured to,
receive a first application status change message from a first mobile edge computing (MEC) server located in radio access network (RAN), the first application status change message indicating one or more applications currently running on the first MEC server,
detect a location update message received at the CN from a UE attached to the RAN, and
in response to detecting the location update message,
obtain service profile data of the UE for at least one service corresponding to at least one of the one or more applications, and
provide the obtained service profile data to the first MEC server.

13. The communications system of claim 12 further comprising:
a subscriber database included in the CN.

14. The communications system of claim 13, wherein the one or more processors are further configured to execute the computer-executable instructions such that the one or more processors are configured to,
identify one or more first services by querying a subscriber database located in the CN, the one or more first services being one or more services to which the UE subscribes,
determine one or more second services, the one or more second services being one or more services associated with the one or more applications currently running on the first MEC server,
determine one or more third services such that each of the one or more third services is a service included in both the one or more first services and the one or more second services, and
obtain, from the subscriber database, service profile data of the UE for the one or more third services.

15. The communications system of claim 14, wherein the subscriber database is a home subscriber server (HSS).

16. The communications system of claim 14, wherein the subscriber database is a unified data management (UDM) platform.

17. The communications system of claim 12, further comprising:
the CN,
wherein the first network element includes at least one of a policy charging and rules function (PCRF) node of the CN or a policy control function (PCF) node of the CN.

18. The communications system of claim 12 further comprising:
the CN and the RAN.

19. The communications system of claim 12, wherein the one or more processors are further configured to execute the computer-executable instructions such that the providing of the obtained service profile data to the first MEC server includes,
generating an MEC service policy,
creating an entry in the MEC service policy,
including the obtained service profile data in the entry, and
providing the MEC service policy, including the entry, to the first MEC server.

20. The communications system of claim 19, wherein the one or more processors are further configured to execute the computer-executable instructions such that one or more processors are configured to,
receive a second application status change message indicating one or more applications currently running on the first MEC server, and
in response to receiving the second application status change message,
generate an updated MEC service policy by updating the entry, and
provide the updated MEC service policy, including the updated entry, to the first MEC server.

* * * * *